May 17, 1938.　　　E. E. COTANCH　　　2,117,654

POWER TRANSMISSION MECHANISM

Filed Aug. 8, 1934　　　2 Sheets-Sheet 1

INVENTOR.
EARL E. COTANCH
BY
Anderson & Liddy
ATTORNEYS.

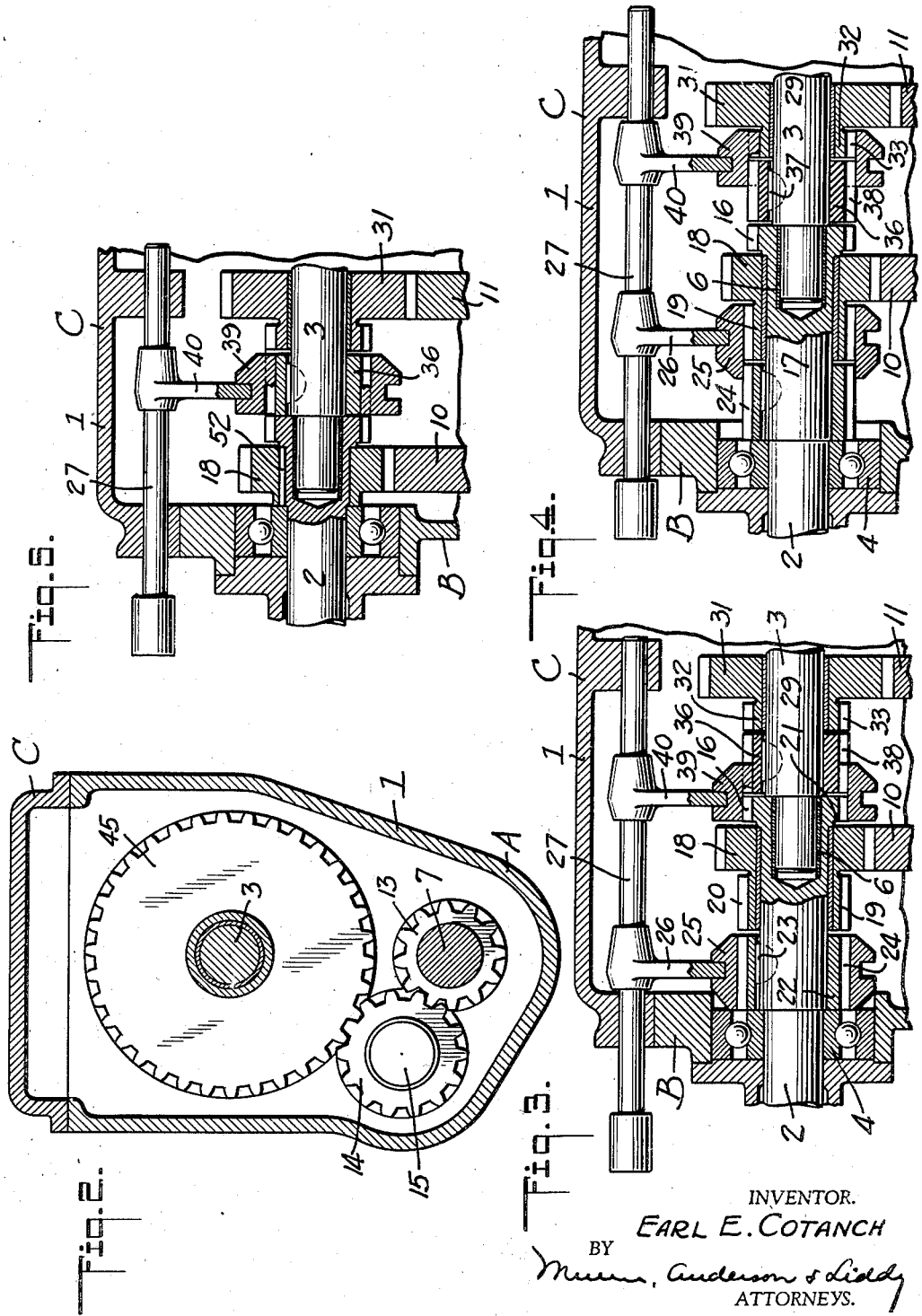

Patented May 17, 1938

2,117,654

UNITED STATES PATENT OFFICE 2,117,654

POWER TRANSMISSION MECHANISM

Earl E. Cotanch, Los Angeles, Calif.

Application August 8, 1934, Serial No. 739,020

6 Claims. (Cl. 74—375)

This invention relates to improvements in power transmission mechanisms of the variable speed type, and has as a general object to provide a power transmission wherein multiple forward speeds and reverse drive can be obtained through gear driving mechanisms which employ gears constantly intermeshed in all of the driving mechanisms.

In the present state of the art, means have been employed in transmissions for moving certain gears of the driving mechanisms, in and out of engagement, or in and out of alinement with their intermeshing gears, for the purpose of obtaining forward and reverse drives. It is a primary object of this invention to provide a transmission wherein the shifting of gears or moving the same out of alinement with their intermeshing gears is completely eliminated.

Transmissions now in general use have utilized gears of the angle or silent type in certain of the driving mechanisms and have provided means to move certain of said gears on a spiral spline, in and out of engagement with certain other gears of the driving mechanisms, thus causing undue wear on the gears and causing same to become noisy with use.

It is a further important object of this invention to provide a transmission comprising a reverse gear driving mechanism, a low gear driving mechanism, an intermediate or second gear driving mechanism, all of the angle or silent gear type, and a high gear or direct drive mechanism, wherein each of the said driving mechanisms of the angle gear type utilizes gears constantly intermeshed to eliminate undue noise and wear of the silent type gears.

There are now in use transmissions which utilize an intermediate or second gear driving mechanism comprising gears constantly intermeshed. In transmissions of this type, one of the gears of the second gear driving mechanism is keyed to the drive or power shaft. When the transmission of this type is operating in high gear or direct drive, all of the gears of the intermediate or second gear driving mechanism are compelled to rotate at high speed, causing undue noise and wear of the gears.

It is a very important object of this invention to provide means to disengage all of the constant mesh driving mechanisms from the drive and driven shafts when the transmission is operating in high gear or direct drive so as to minimize noise and wear in the driving mechanism.

A still further object of the invention is to provide a transmission which utilizes driving mechanisms comprising gears constantly intermeshed and of the angle or silent type, together with a simple and effective means for placing the transmission in a plurality of respective conditions of forward drive, in a condition of reverse drive or in a neutral condition.

In addition to the objects and advantages above referred to, other objects and advantages will be apparent from the following description.

Referring to the drawings,

Figure 2 is a transverse sectional view taken on the line 2—2 of Figure 1, looking in the direction of the arrows;

Figures 3 and 4 are fragmentary views similar to Figure 1, illustrating different positions of the mechanism of the transmission;

Figure 5 is a fragmentary sectional view illustrating a modified form of the invention.

Figure 1:
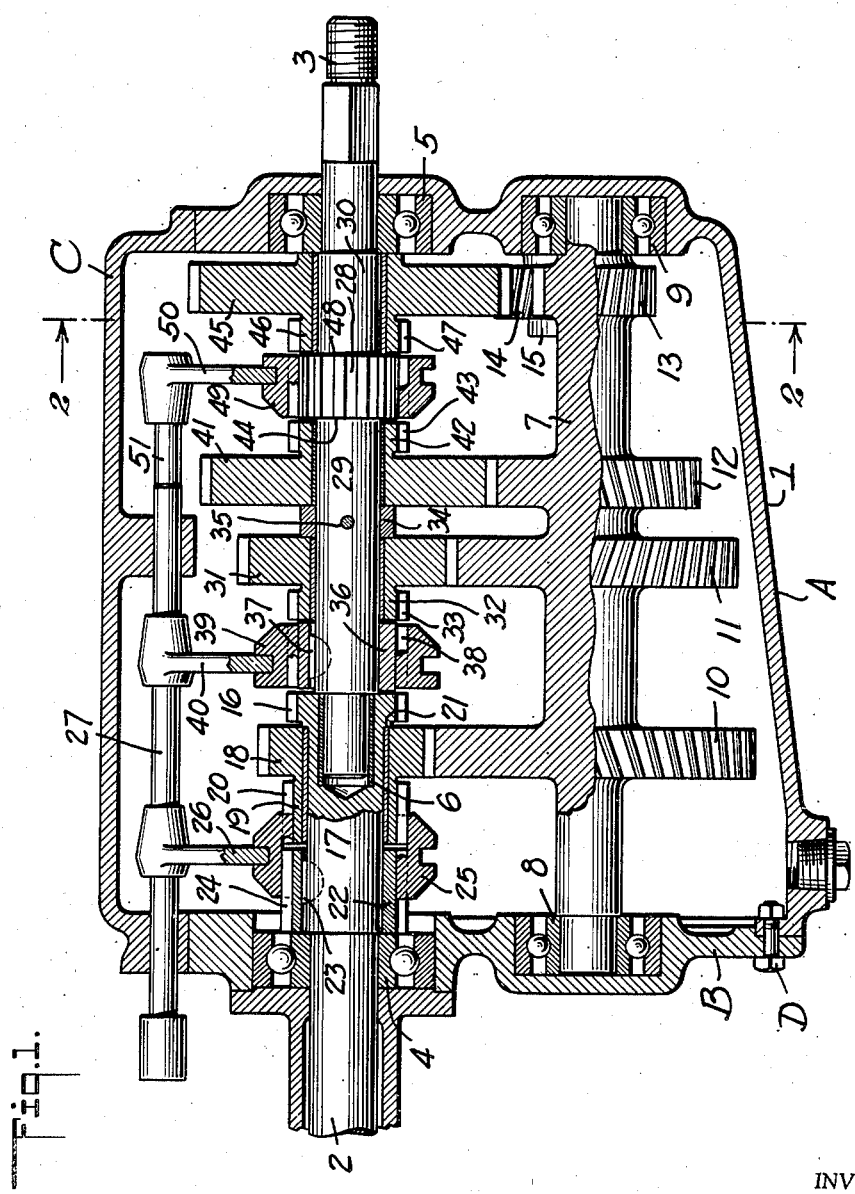
Figure 1 is a vertical longitudinal sectional view of the transmission, with parts in elevation.

Referring now to the embodiment of the invention illustrated in the drawings, the transmission comprises a housing 1 which, for convenient assembly of the organization, is comprised of a section A, a front plate B and a cover plate C. Section A and plate B are secured together by bolts D, as illustrated. The cover plate C can be securely fastened to section A and plate B in any desired well known manner.

A drive shaft or power shaft 2 is suitably journaled in the housing 1 and in axial alinement therewith is a driven shaft or load shaft 3. As shown, the drive shaft 2 is mounted in a bearing 4 and the driven shaft 3 is mounted in a bearing 5 at one end thereof and in a bushing 6 at the opposite end, the said bushing being pressed into the hollow end of the drive shaft 2 in the conventional manner.

A countershaft 7 is parallel to shafts 2 and 3 and the same is suitably journaled in the said housing and mounted in bearings 8 and 9 at the opposite ends thereof, as illustrated. The numerals 10, 11, 12 and 13 indicate helical or angle type gears and the same are integral with the countershaft 7.

A helical or angle type reverse idler gear 14 is constantly intermeshed with the gear 13 and the same is mounted and free to rotate on a stud 15, which latter is rigidly secured to the housing 1 in any desired well known manner.

At the inner end of the aforementioned drive shaft 2 peripheral clutch teeth 16 are cut thereon and the latter project outwardly beyond the cylindrical surface 17 of said shaft. A helical or angle type main drive gear 18 is mounted and free to rotate on the cylindrical surface 17 and the same is constantly intermeshed with aforementioned gear 10. Gear 18 includes a relatively wide hub portion 19 on the outer surface of which latter are cut clutch teeth 20. The said gear 18 is prevented from axial displacement by a shoulder 21 formed by the projecting clutch teeth 16 and by a collar 22 which latter is suitably keyed to the drive shaft 2 as illustrated at 23. The outer surface of collar 22 is splined at 24 so as to correspond to clutch teeth 20 on hub 19 and a relatively wide clutch ring 25 is correspondingly splined in the conventional manner and the same is slidably mounted on collar 22. It will be noted at this point that the collar 22 is of corresponding length to the clutch ring 25 and that the hub 19 is relatively shorter than the said ring. The ring 25 is axially shiftable by means of a conventional shifting fork 26 to respectively different positions on the spline 24 for a purpose to be presently described. The shifting fork 26 is rigidly secured to a shifting rod 27 in any desired well known manner.

The driven shaft 3 is provided with an enlarged splined portion 28, a cylindrical portion 29 of smaller diameter and another cylindrical portion 30 also of smaller diameter than the said splined portion.

A helical or angle type second speed gear 31 is mounted and free to rotate on the cylindrical portion 29 and the same is constantly intermeshed with the aforementioned gear 11. It will be noted at this point that the gears 18, 10, 11 and 31 comprise the gears of the intermediate or second gear driving mechanism. Gear 31 includes a hub portion 32 of conventional width on the outer surface of which latter are cut clutch teeth 33 and the said gear is prevented from axial displacement by a collar 34, which latter is pinned to the driven shaft 3 as illustrated at 35, and by another collar 36 which latter is of conventional width and which same is keyed to the said driven shaft, as illustrated at 37. The outer surface of collar 36 is splined at 38 so as to correspond with clutch teeth 33 on hub 32 and with clutch teeth 16 on the end of the aforementioned drive shaft 2. A conventional width clutch ring 39 is correspondingly splined in the usual manner and the same is slidably mounted on the collar 36. The said ring is axially shiftable by means of a shifting fork 40 into alternative engagement with the clutch teeth 16 or the clutch teeth 33. The shifting fork 40 is rigidly secured to the aforementioned shifting rod 27 in the conventional manner. Attention is directed to the splined hubs 19 and 32 of the gears 18 and 31, respectively, which same as heretofore described are of respectively different face widths, and to the clutch rings 25 and 39 which latter, as previously described, are respectively formed and proportioned relatively to the face widths of the said hubs for a purpose soon to appear.

A helical or angle type low speed gear 41 is also mounted and free to rotate on the cylindrical portion 29 and the same is constantly intermeshed with aforementioned gear 12. At this point it will be noted that the gears 18, 10, 12 and 41 comprise the gears of the low gear driving mechanism. The gear 41 includes a hub portion 42 and clutch teeth 43 are cut on the outer surface of the latter. The said gear is prevented from axial displacement by the aforementioned collar 34 and by a shoulder 44, which latter is formed on the driven shaft 3 by the outward projection of the enlarged splined portion 28.

A helical or angle type reverse gear 45 is mounted and free to rotate on cylindrical portion 30, and the same is constantly intermeshed with reverse idler gear 14. It is to be noted at this point that the gears 18, 10, 13, 14 and 45 comprise the gears of the reverse gear driving mechanism. Gear 45 includes a hub portion 46 and clutch teeth 47 are cut on the outer surface of the said hub. The gear 45 is prevented from axial displacement by the aforementioned bearing 5, as illustrated, and by a shoulder 48, which latter is formed on the driven shaft by the outward projection of the enlarged splined portion 28.

A conventional clutch ring 49 is splined in the conventional manner correspondingly to the spline on the enlarged portion 28 and to the respective clutch teeth 43 and 47, and the same is slidably mounted on the said enlarged splined portion. The ring is axially shiftable into alternative engagement with the clutch teeth 43 or 47 by means of a shifting fork 50, which latter is rigidly secured to a shifting rod 51 in any desired well known manner.

It is desired to be made known at this point that while the gears of the respective driving mechanisms as described are preferably of the angle or silent type, it is to be understood that gears of any desired well known type can be utilized in the said driving mechanisms.

In the operation of the transmission as described above, a neutral condition is obtained when the clutch rings 25, 39 and 49 are in their respective positions as illustrated in Figure 1 of the drawings. It will be noted that clutch ring 25, in this position, engages a portion of spline 24 and a portion of clutch teeth 20, thus drivingly connecting the main drive gear 18 to the drive shaft 2 and causing the gears of the respective driving mechanisms to be rotated thereby.

Reverse speed is obtained by moving the shifting rod 51 to the right in Figure 1, thus engaging the clutch ring 49 with the clutch teeth 47 and thereby drivingly connecting the gear 45 to the driven shaft. The drive is then transmitted from the drive shaft 2 to the driven shaft 3 through the aforementioned reverse gear driving mechanism.

Low gear or first speed is obtained by moving the shifting rod 51 to the left in Figure 1, thus engaging the clutch ring 49 with the clutch teeth 43 and thereby drivingly connecting the gear 41 to the driven shaft. The drive is then transmitted from the drive shaft 2 to the driven shaft 3 through the aforementioned low gear driving mechanism.

Intermediate or second speed is obtained by moving the shifting rod 27 to the right as illustrated in Figure 4 of the drawings, thus engaging the clutch ring 39 with the clutch teeth 33 and thereby drivingly connecting the gear 31 to the driven shaft. The drive is then transmitted from the drive shaft 2 to the driven shaft 3 through the aforementioned intermediate or second gear driving mechanism. It is to be noted that when the shifting rod 27 is moved to the right as just described, that the aforementioned clutch ring 25 will be simultaneously moved in the same direction and into further engagement with the aforementioned clutch teeth 20 for the reason that the shifting forks 26 and 40 are each securely fastened to the rod 27 as previously described. A portion of the ring 25 will engage the spline 24, as illustrated, for the reason, as previously described, that the aforementioned hub 19 is relatively shorter than the said ring.

High speed is obtained by moving the shifting rod 27 to the left as illustrated in Figure 3, thereby engaging the clutch ring 39 with the clutch teeth 16 and thus directly connecting the drive shaft 2 with the driven shaft 3. The drive is then transmitted from the drive shaft to the driven shaft directly or in high gear. During the operation as just described it will be noted that the clutch ring 25 is simultaneously moved out of engagement with the clutch teeth 20 so that the ring 25 rests entirely on the spline 24, thus disengaging the main drive gear 18 from the drive shaft 2. The gear 18 and the respective constant mesh driving mechanisms will then remain stationary or will rotate at slow speed due to friction of parts. In placing the transmission in conditions of neutral, second speed or high speed with release of the constant mesh driving mechanisms during high speed drive, as heretofore described, the respectively different face widths of the aforesaid hubs 19 and 32 and the form and proportion of the aforementioned clutch rings 25 and 39 relative to the face widths of the said hubs, respectively, together with the simultaneous movement of the said clutch rings, lend themselves to an arrangement for standard shifts or standard change speed as conventionally used in automobile transmissions. The clutch ring 25, when in the position as illustrated in Figure 3, can be moved into easy engagement with the clutch teeth 20 for the reason that the respective constant mesh driving mechanisms are not loaded during such operation and the main drive gear 18 will either be stationary or moving relatively to the drive shaft 2.

Figure 5 illustrates a modified form of construction of the transmission, wherein the main drive gear 18 is keyed to the drive shaft 2, as illustrated at 52, and wherein the collar 22, the clutch ring 25 and the shifting fork 26, shown in Figure 1, are eliminated. In this type of construction, when the transmission is operating in high gear, the gears of the respective constant mesh driving mechanisms will be compelled to rotate at a speed in proportion to their respective ratios.

While a preferred form of the invention is herein described, it is to be understood that the drawings and the description thereof are to be considered as illustrative of, rather than limitative upon, the broader claims, because it will be apparent to those skilled in the art that changes may be made in the mechanism without departing from the scope of this invention.

I claim:

1. In a transmission organization, independent shafts arranged in axial alinement and a plurality of gear trains, each train including an idle gear on a respective one of said shafts, the idle gears having toothed hubs of respectively different face widths; a plurality of clutches rigidly connected together to move simultaneously as a unit from one position to another and each movable on and operatively carried by a respective one of said shafts and complementary with an idle gear of said shaft to engage therewith and disengage therefrom according as the clutches are simultaneously moved from one position to another, the clutches being formed and proportioned relative to the face widths of the idle gears so that when the clutches are moved to another position of adjustment one thereof will be wholly disengaged from its complementary idle gear and the other maintained in engagement with its complementary idle gear.

2. In a transmission organization, drive and driven shafts, respectively, a driving mechanism embodying constantly intermeshed gears in which one thereof is mounted to idle on the drive shaft and another thereof on the driven shaft; two clutch mechanisms rigidly connected together to move simultaneously as a unit along said shafts, one of said mechanisms being movable on and operatively carried by the drive shaft and the other being movable on and operatively carried by the driven shaft and each complementary with one of the aforementioned idle gears and including means to engage therewith or disengage therefrom according as the clutches are moved to certain positions on the shafts, one of said clutches including means to maintain engagement with its complementary idle gear when the other of said clutches is wholly disengaged from its complementary idle gear.

3. In a transmission organization, drive and driven shafts, respectively, a gear train embodying constantly intermeshed gears in which one thereof is mounted to idle on the drive shaft and another thereof on the driven shaft; two clutch mechanisms rigidly connected to move axially in unitary movement for a limited distance in either direction along said shafts, the said clutches being movable on and operatively carried by the drive and driven shafts, respectively, and each complementary with one of the aforementioned idle gears and including means to engage therewith or disengage therefrom according as the clutches are moved to certain positions on the shafts, and means for simultaneously moving the clutches from a position of extremity for movement thereof in one direction wherein both of said idle gears are engaged, to a position of extremity for movement thereof in the opposite direction wherein both of said idle gears are disengaged.

4. In a transmission organization, drive and driven shafts, respectively, said shafts being arranged in axial alinement, a driving mechanism embodying constantly intermeshed gears in which one thereof is mounted to idle on the drive shaft and another thereof on the driven shaft; two clutch mechanisms rigidly connected together to move as a unit simultaneously along said shafts, one of said mechanisms being movable on and operatively carried by the drive shaft and the other being movable on and operatively carried by the driven shaft and each complementary with one of the aforementioned idle gears and including means to engage therewith or disengage therefrom according as the clutches are moved to certain positions on the shafts, means for moving said clutches to one of said positions wherein both of said gears are engaged, and to another of said positions wherein only one of said gears is engaged and to still another of said positions wherein both of said gears are disengaged.

5. In a transmission organization, drive and driven shafts, respectively, said shafts being arranged in axial alinement, a plurality of forward driving mechanisms and a reverse driving mechanism embodying constantly intermeshed gears, each of said driving mechanisms including a gear mounted to idle on the drive shaft and another gear mounted to idle on the driven shaft, a clutch mechanism movable on and operatively carried by the drive shaft and two clutch mechanisms movable on and operatively carried by the driven shaft and each complementary with certain of the aforementioned idle gears and including means to engage therewith or disengage therefrom according as the clutches are moved to certain positions on the shafts so as to provide means for placing the transmission in respective conditions of forward drive or in a condition of reverse drive, two of said clutches being rigidly connected together so as to move simultaneously along said shafts and one of the connected clutches including means to maintain engagement with its complementary idle gear when the other of said clutches is wholly disengaged from its complementary idle gear.

6. In a transmission organization, drive and driven shafts, respectively, said shafts being arranged in axial alinement, a plurality of driving mechanisms embodying constantly intermeshed gears in which one thereof is mounted on the drive shaft and another thereof on the driven shaft, each of said last named gears being adapted to idle or to be positively driven and each including a hub relatively different in face widths; two clutch mechanisms rigidly connected together to move as a unit along said shafts, one of said mechanisms being movable on and operatively carried by the drive shaft and the other being movable on and operatively carried by the driven shaft and each complementary with the hub of one of the last named gears and including means to engage therewith or disengage therefrom according as the clutches are moved to certain positions on the shafts, one of said clutches including means to maintain engagement with its complementary hub on one of said gears when the other of said clutches is wholly disengaged from its complementary hub on the other of said gears.

EARL E. COTANCH.